United States Patent Office 3,365,442
Patented Jan. 23, 1968

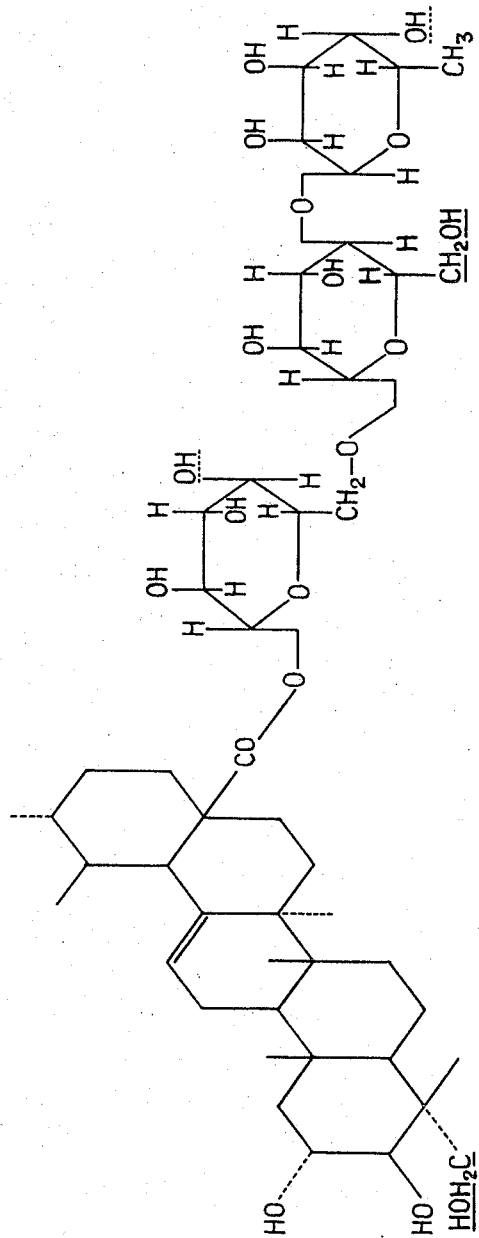

3,365,442
DERIVATIVES OF ASIATICOSIDE AND THEIR PROCESS OF PREPARATION
Albert Rakoto Ratsimamanga, 1 Blvd. Suchet; Marc Chanez, 84 Rue de la Chapelle; and Pierre Boiteau, 77 Rue de l'Abbe Carton, all of Paris, France
Filed Aug. 21, 1964, Ser. No. 391,109
Claims priority, application France, Aug. 28, 1963, 945,878
2 Claims. (Cl. 260—210)

The present invention relates to new derivatives of asiaticoside.

Asiaticoside is a chemical compound extracted from the plant "Centella asiatica" which is found in particular in Madagascar. It has the empirical formula $C_{48}H_{78}O_{19}$ and the structural formula illustrated in the annexed drawing. This structural formula was established following the investigations of P. Boiteau, A. Buzas, E. Lederer and Madame J. Polonsky (Bull. Soc. Chim. Biol., 1949, 31, 46), of Madame J. Polonsky (C.R. Ac. Sc. 1949. 228, 1450; 1950, 230, 485; 1950, 230, 1784, and Bull Soc. Chim. Fr. 1952, 19, 649; 1952, 19, 1015), of Madame J. Polonsky, E. Sach and E. Lederer (Bull. Soc. Chim. Fr. 1959, 880), and Madame J. Polonsky and J. Zylber (Bull. Soc. Chim. Fr. 1961, 1586).

Asiaticoside is thus formed by the combination of one mole of $2\alpha,3\beta,23$-trihydroxy ursa-12-en 28-oic acid (or asiatic acid), two moles of glucose and one mole of rhamnose.

Asiaticoside has interesting therapeutic properties and in particular wound healing and antiphlogistic properties which are however difficult to utilize in certain cases because of the insolubility of asiaticoside in water.

The object of the invention is to remedy this drawback.

The invention provides for this purpose new water soluble derivatives of asiaticoside formed by a tetrahemisuccinate of the asiaticoside having the empirical formula $C_{64}H_{94}O_{31}$ and a M.P. of 165–170° C., and the salts of this tetrahemisuccinate and in particular the alkali and alkaline-earth metal salts thereof. This tetrahemisuccinate is obtained from the esterification of four hydroxyls of asiaticoside with four moles of succinic acid (HOOC—$CH_2$—$CH_2$—COOH), each of which retain a free carboxyl group which can be salified. The four esterified hydroxyls are the two primary hydroxyls (underlined in full line in the drawing) one of which is carried by the molecule of asiatic acid and the other by one molecule of glucose, and two secondary hydroxyls which are probably those underlined in dotted line in the drawing, one on the second molecule of glucose and the other on the molecule of rhamnose.

However this may be, said tetrahemisuccinate is well characterized by its physico-chemical properties. It melts as mentioned hereinbefore, at 165–170° C. in a capillary tube and has a $[\alpha]_D^{25}=-4.95°$ (water). In infra-red spectography (Unicam spectograph KBr) the following principal bands, characterized by their wave number (in cm.$^{-1}$), are observed for this tetrahemisuccinate:

800, 804 and 828, double bond at 12:13, deformation vibration of C—H,
920, O—H of carboxyl, deformation vibration,
1024 and 1055, C—O of secondary hydroxyls (note the disappearance of the primary band at 1010 cm.$^{-1}$),
1065, C—O—C of oses,
1160, succinate,
1445, $CH_2$ adjacent the double bond,
1650, valence oscillation of C=C (double bond),
1730, ester,
2920, $CH_2$,
3420, O—H of secondary hydroxyls (no band at 3450 cm.$^{-1}$).

The calcium salt of the tetrahemisuccinate melts at 274° C. (decomposition) in a capillary tube.

As mentioned hereinbefore, one of the essential advantages of these new derivatives is their solubility in water. While asiaticoside is practically insoluble in water, its free tetrahemisuccinate has a solubility exceeding 10% and the calcium salt of the latter has a solubility exceeding 30%.

The solubility in water of the new derivatives opens up new fields of application of asiaticoside in human therapeutics. These derivatives can in particular be employed in the preparation of eye-washes for ophthalmology.

Another object of the invention is to provide a process of preparing these new derivatives. This process comprises reacting one mole of asiaticoside with more than four moles of succinic anhydride so as to esterify the asiaticoside then, if desired, salifying the tetrahemisuccinate thus obtained.

The esterification reaction is advantageously carried out in a solvent such as pyridine. It can be carried out at any temperature between room temperature and the reflux temperature of the reaction mixture.

The following examples illustrate the invention, it being understood, however, that the invention is not intended to be limited thereby.

Example 1

20 g. of asiaticoside and 12 g. of succinic anhydride are put into 100 ml. of pyridine and the mixture is refluxed for 1½ hours; as required, it is bleached on charcoal and concentrated until dry in a water bath under a vacuum; 100 ml. of the methanol/ether mixture in the proportions of 95:5 (by volume) are added to the solid residue obtained and the mixture is decanted; it is once more dried under a vacuum; the operation is recommended a second time and then a third time with the same mixture of solvents; in this way the excess of succinic anhydride is eliminated.

To eliminate the excess of unreacted asiaticoside, the solid residue of the aforementioned last washing is extracted with 100 ml. of distilled water; 8 g. of calcium carbonate are added; the mixture is heated for some minutes and the excess carbonate is eliminated by filtering on kieselguhr.

The solution is then concentrated to 20 ml. and the calcium salt of the tetrahemisuccinate of asiaticoside is precipitated by the addition of methyl alcohol. The salt is collected on a filter and washed several times with alcohol.

To obtain the tetrahemisuccinate in its free form, the calcium is displaced by the addition of oxalic acid, the solution is filtered, concentrated until dry and the residue obtained is washed with ether.

Asiaticoside tetrahemisuccinate theoretically consumes 16.48% of KOH (found: 16.37); its physical constants are: M.P. 165–170° C. (in a capillary tube); $[\alpha]_D$: $-4.95°$ (water).

The calcium salt has an M.P. of 274° C. (decomposition) in a capillary tube. 100 mg. of the salt of Ca theoretically yield 17.82 ml. Ca oxalate (found: 16–20 mg.).

Example 2

20 g. of asiaticoside and 20 g. of succinic anhydride are put into 100 ml. of anhydrous pyridine. The mixture is left in contact for 24 hours at ordinary temperature. The rest of the preparation is as mentioned hereinbefore, except that a greater number of washings are employed to eliminate the excess succinic anhydride.

It must be understood that the invention is not intended to be limited by the modes of preparation described which have been given merely by way of examples.

Having now described our invention what we claim as new and desire to secure by Letters Patent is:

1. A tetrahemisuccinate of the asiaticoside having the empirical formula $C_{64}H_{94}O_{31}$ and a M.P. of 165–170° C.

2. The calcium salt of a tetrahemisuccinate of the asiaticoside having the empirical formula $C_{64}H_{94}O_{31}$ and a M.P. of 165–170° C.

References Cited

UNITED STATES PATENTS

| 2,868,781 | 1/1959 | Gaertner et al. | 260—210 |
| 3,063,983 | 11/1962 | Quaedvlieg et al. | 260—234 |

LEWIS GOTTS, *Primary Examiner.*

ELBERT L. ROBERTS, *Examiner.*

JOHNNIE R. BROWN, *Assistant Examiner.*